(12) United States Patent
Bidnur et al.

(10) Patent No.: US 7,720,294 B2
(45) Date of Patent: May 18, 2010

(54) UNIFIED DECODER ARCHITECTURE

(75) Inventors: Ravindra Bidnur, Bangalore (IN); Ramadas Lakshmikanth Pai, Bangalore (IN); Bhaskar Sherigar, Bangalore (IN); Aniruddha Sane, Bangalore (IN); Sandeep Bhatia, Bangalore (IN); Gaurava Agarwal, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1188 days.

(21) Appl. No.: 10/775,652

(22) Filed: Feb. 9, 2004

(65) Prior Publication Data

US 2005/0175106 A1   Aug. 11, 2005

(51) Int. Cl.
*G06K 9/36* (2006.01)
*H04N 7/12* (2006.01)
*H04N 11/02* (2006.01)

(52) U.S. Cl. .............. 382/233; 375/240.25; 375/240.01

(58) Field of Classification Search ...............................
375/240.01–240.29, 127; 345/516, 521, 345/530, 555; 341/60; 348/384.1–440.1; 382/232–253, 100; 708/203; 709/246
See application file for complete search history.

(56) References Cited

U.S. PATENT DOCUMENTS 5,812,760 A    9/1998 Mendenhall et al.
5,912,676 A *  6/1999 Malladi et al. .............. 345/531
2003/0185306 A1* 10/2003 MacInnis et al. ....... 375/240.25

FOREIGN PATENT DOCUMENTS

EP        1028593 A     8/2000
WO    WO-03/085494 A   10/2003

OTHER PUBLICATIONS

Klepac et al: "Integration of DV to D9 and DVCAM to MPEG-2 System", Video/Image Processing and Multimedia Communications 4$^{th}$ Eurasip-IEEE Region 8 International Symposium on VIPROMCOM, Jun. 16-19, 2002, Piscataway, NJ, USA, IEEE, pp. 421-426, XP010598754, ISBN: 953-7044-01-7.
Margenstern M: "Frontier Between Decidability and Undecidability: A Survey", Theoretical Computer Science, Amsterdam, NL, vol. 231 No. 2, Jan. 28, 2000, pp. 217-251, XP002308666, ISSN: 0304-3975.

* cited by examiner

*Primary Examiner*—Samir A Ahmed
*Assistant Examiner*—Mehdi Rashidian
(74) *Attorney, Agent, or Firm*—McAndrews, Held & Malloy, Ltd.

(57) ABSTRACT

Presented herein is a unified decoder architecture. A system comprises a video decoder, instruction memory, and a host processor. The video decoder decodes the video data encoded with the particular standard. The instruction memory stores a first set of instructions and a second set of instructions. The first set of instructions are for decoding encoded video data according to a first encoding standard. The second set of instruction are for decoding encoded video data according to a second encoding standard. The host processor provides an indication to the video decoder indicating the particular encoding standard. The video decoder executes the first set of instructions if the indication indicates that the particular encoding standard is the first encoding standard and executes the second set of instructions if the indication indicates that the particular encoding standard is the second encoding standard.

20 Claims, 3 Drawing Sheets

UNIFIED DECODER ARCHITECTURE

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A number of different standards exist for encoding video data. In some cases, the video data is also compressed as part of the encoding process. For example, the Motion Pictures Expert Group (MPEG) has devised two such standards commonly known as MPEG-2, and Advanced Video Coding (MPEG-4). Another example of an encoding standard is known as the Digital Video-25 (DV-25).

The encoded video data is decoded by a video decoder. However, a video decoder can receive encoded video data that is encoded with any one of a wide variety of encoding standards. In order to display the video data, the video decoder needs to be able to determine and decode video data that is encoded with any one of the wide variety of encoding standards.

Although some video decoders are capable of decoding video data from multiple formats, the video decoders comprise special hardware dedicated to decoding each one of the wide variety of encoding standards. This is disadvantageous because the additional hardware increases the cost of the decoder system.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

Presented herein is a unified decoder architecture.

In one embodiment, there is presented a system for decoding video data encoded with a particular standard. The system comprises a video decoder, instruction memory, and a host processor. The video decoder decodes the video data encoded with the particular standard. The instruction memory stores a first set of instructions and a second set of instructions. The first set of instructions are for decoding encoded video data according to a first encoding standard. The second set of instruction are for decoding encoded video data according to a second encoding standard. The host processor provides an indication to the video decoder indicating the particular encoding standard. The video decoder executes the first set of instructions if the indication indicates that the particular encoding standard is the first encoding standard and executes the second set of instructions if the indication indicates that the particular encoding standard is the second encoding standard.

In another embodiment, there is presented a method for decoding video data encoded with a particular standard. The method comprises providing an indication to a video decoder indicating the particular encoding standard to the video decoder, executing a first set of instructions if the indication indicates that the particular encoding standard is a first encoding standard, and executing a second set of instructions if the indication indicates that the particular encoding standard is the second encoding standard.

In another embodiment, there is presented a system for decoding video data encoded with a particular standard. The system comprises a code memory and a processor. The code memory stores instructions. The processor loads the code memory with a first set of instructions for decoding encoded video data according to a first encoding standard, where the video data is encoded according to the first encoding standard and loads the code memory a second set of instruction for decoding encoded video data according to a second encoding standard, wherein the video data is encoded according to the second encoding standard.

These and other advantages and novel features of the present invention, as well as details of an illustrated embodiment thereof, will be more fully understood from the following description and drawings.

DETAILED DESCRIPTION OF THE INVENTION

Figure 1:
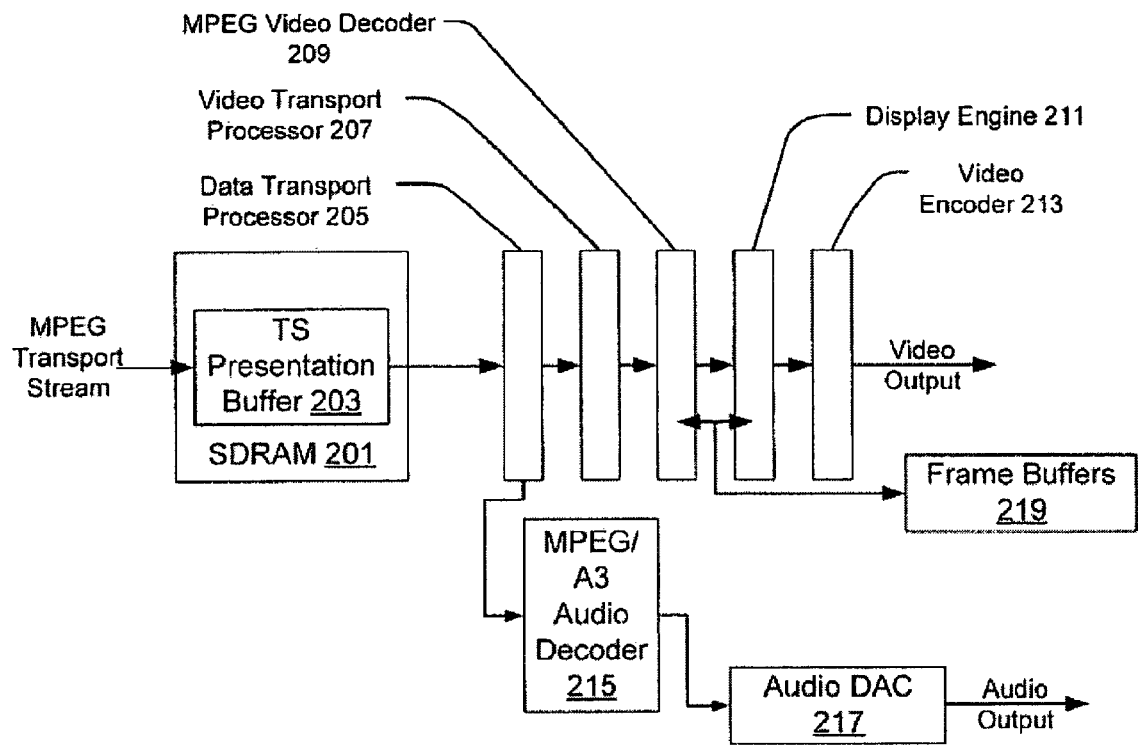
FIG. 1 is a block diagram of an exemplary decoder system for decoding compressed video data, in accordance with an embodiment of the present invention.

Referring now to FIG. 1 there is illustrated a block diagram of an exemplary decoder system for decoding compressed video data, in accordance with an embodiment of the present invention. Data is received and stored in a presentation buffer 203 within a Synchronous Dynamic Random Access Memory (SDRAM) 201. The data can be received from either a communication channel or from a local memory, such as, for example, a hard disc or a DVD. In addition, the video data may be compressed using different encoding standards, such as, but not limited to, MPEG-2, DV-25, and MPEG-4.

The data output from the presentation buffer 203 is then passed to a data transport processor 205. The data transport processor 205 demultiplexes the transport stream into packetized elementary stream constituents, and passes the audio transport stream to an audio decoder 215 and the video transport stream to a video transport processor 207 and then to an MPEG video decoder 209. The audio data is then sent to the output blocks, and the video is sent to a display engine 211.

The display engine 211 scales the video picture, renders the graphics, and constructs the complete display. Once the display is ready to be presented, it is passed to a video encoder 213 where it is converted to analog video using an internal digital to analog converter (DAC). The digital audio is converted to analog in an audio digital to analog converter (DAC) 217.

The video decoder 209 can decode encoded video data that is encoded with any one of a plurality of encoding standards. The video decoder 209 uses firmware to decode the encoded video data. A portion of the firmware can be used for decoding video data for each of the plurality of standards, while other portions are specific to a particular standard. Accordingly, the video decoder executes a combination of the portions of the firmware that are common for decoding each of the different standards and the portions that are unique to the specified standard used for encoding the encoded video data.

A host processor 290 detects the specific standard used for encoding the encoded video data and provides an indication indicating the specific standard to the video decoder 209. Responsive thereto, the video decoder 209 selects the portions of the firmware that are specific to the encoding standard for execution along with the portions that are common for all of the standards.

Figure 2:
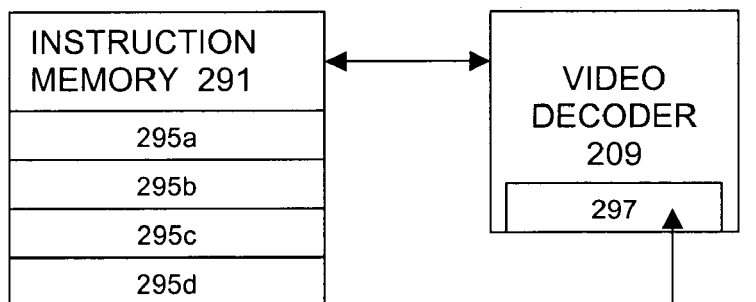
FIG. 2 is a block diagram of a circuit for decoding encoded video data in accordance with an embodiment of the present invention.
Figure 2:
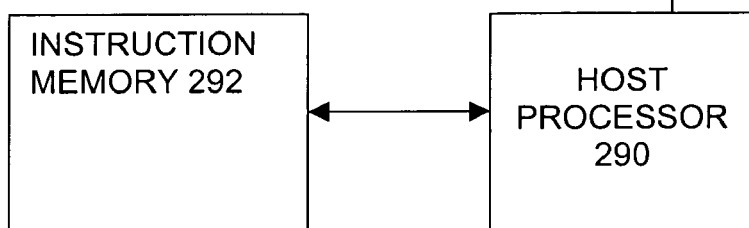

Referring now to FIG. 2, there is illustrated a block diagram of a circuit for decoding encoded video data in accordance with an embodiment of the present invention. The circuit comprises a video decoder 209, a host processor 290, a first instruction memory 291, and a second instruction memory 292. The first instruction memory 291 stores firmware comprising a first plurality of instructions 295a that are common for decoding encoded video data encoded with any of a plurality of encoding standards, a second plurality of instructions 295b that is unique for decoding encoded video data encoded with a first encoding standard, a third plurality of instructions 295c that is unique for decoding encoded video data encoded with a second encoding standard, a fourth plurality of instructions 295d that is unique for decoding encoded video data encoded with a third encoding standard. The first encoding standard can comprise, for example, MPEG-2. The second encoding standard can comprise, for example, DV-25. The third encoding standard can comprise, for example, MPEG-4. Although the pluralities of instructions 295a, 295b, 295c, 295d are indicated by continuous regions for ease of illustration, it is noted that the pluralities of instructions 295a, 295b, 295c, 295d do not necessarily occupy continuous regions of the first instruction memory 291.

The host processor 290 executes instructions stored in the second instruction memory 292. Execution of the instructions in the second instruction memory 292 cause the host processor 290 to detect the encoding standard used for encoding the compressed video data and provide an indicator indicating the encoding standard to the video decoder 209.

The video decoder 209 includes a control register 297 comprising a plurality of bits. The host processor 290 includes the encoding standard to the video decoder 209 by setting certain values in one or more of the bits in the control register. For example, in an exemplary case, the host processor 290 can set two bits from the control register 297 to indicate the encoding standard, wherein the value of the two bits indicate the encoding standard as set forth in the table below.

| Bit Value | Encoding Standard |
| --- | --- |
| 00 | Not Used |
| 01 | MPEG-2 |
| 10 | DV-25 |
| 11 | MPEG-4 |

Based on the indicated encoding standard, the video decoder 209 selects and executes the portions of the firmware that are specific to the encoding standard for execution along with the portions that are common for the plurality of encoding standards.

Figure 3:
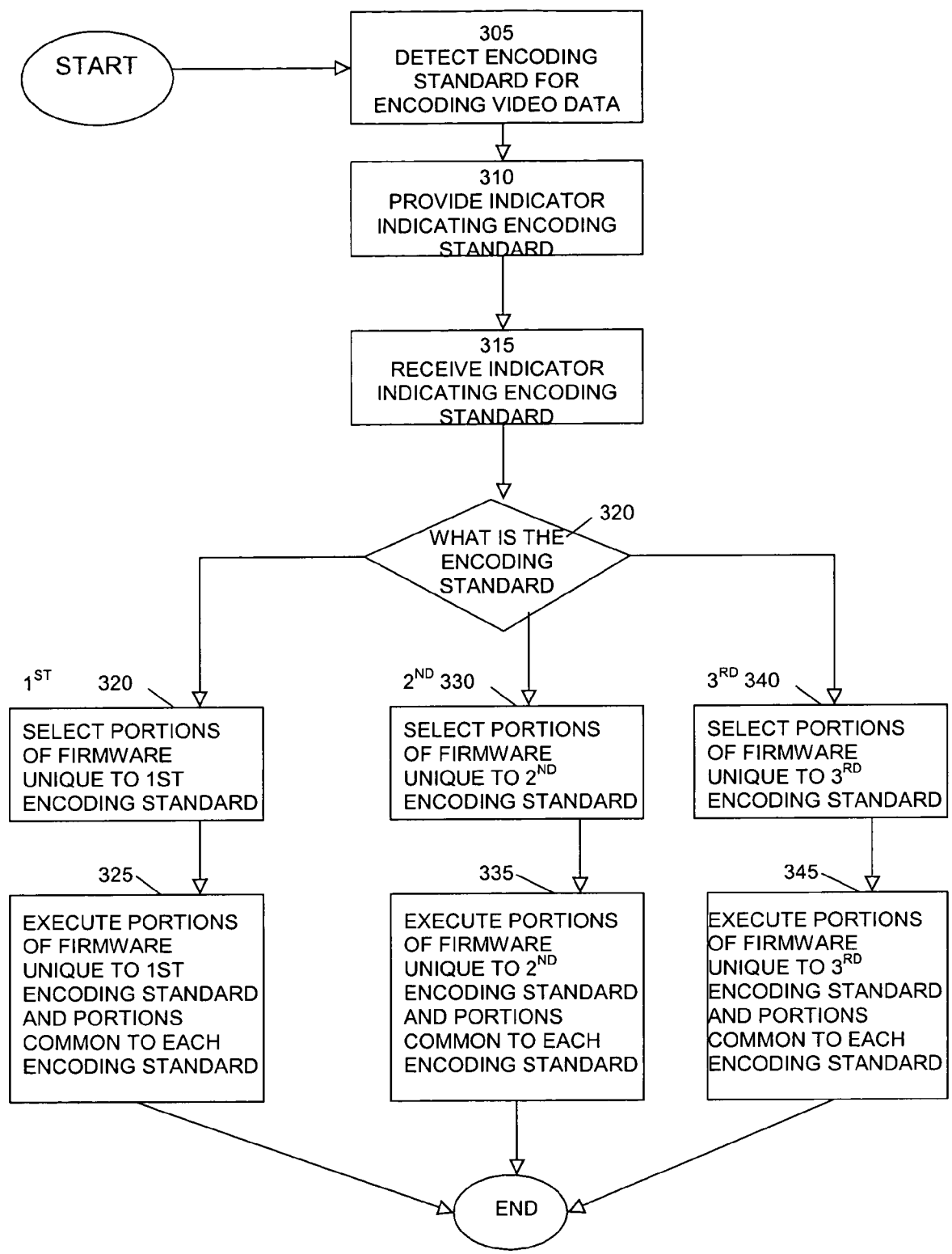
FIG. 3 is a flow diagram for decoding compressed video data in accordance with an embodiment of the present invention.

Referring now to FIG. 3, there is illustrated a flow diagram for decoding compressed video data in accordance with an embodiment of the present invention. At 305, the host processor 290 detects the encoding standard for encoding the encoded video data.

After determining the encoding standard for encoding the encoded video data, the host processor 290 provides (310) an indication indicating the encoding standard to the video decoder 209.

At 315, the video decoder 209 receives the indication indicating the encoding standard. At 320, a determination is made whether the encoding standard is a first encoding standard, a second encoding standard, or a third encoding standard.

If the encoding standard is a first encoding standard at 320, the video decoder 209 selects (325) the portions of the firmware that are unique to the first encoding standard. At 330, the video decoder 209 decodes the encoded video data by executing the portions of the firmware that are unique to the first encoding standard and the portions of the firmware that are common to all of the plurality of encoding standards.

If the encoding standard is a second encoding standard at 320, the video decoder 209 selects (335) the portions of the firmware that are unique to the second encoding standard. At 340, the video decoder 209 decodes the encoded video data by executing the portions of the firmware that are unique to the second encoding standard and the portions of the firmware that are common to all of the plurality of encoding standards.

If the encoding standard is a third encoding standard at 320, the video decoder 209 selects (355) the portions of the firmware that are unique to the third encoding standard. At 360, the video decoder 209 decodes the encoded video data by executing the portions of the firmware that are unique to the third encoding standard and the portions of the firmware that are common to all of the plurality of encoding standards.

Figure 4:
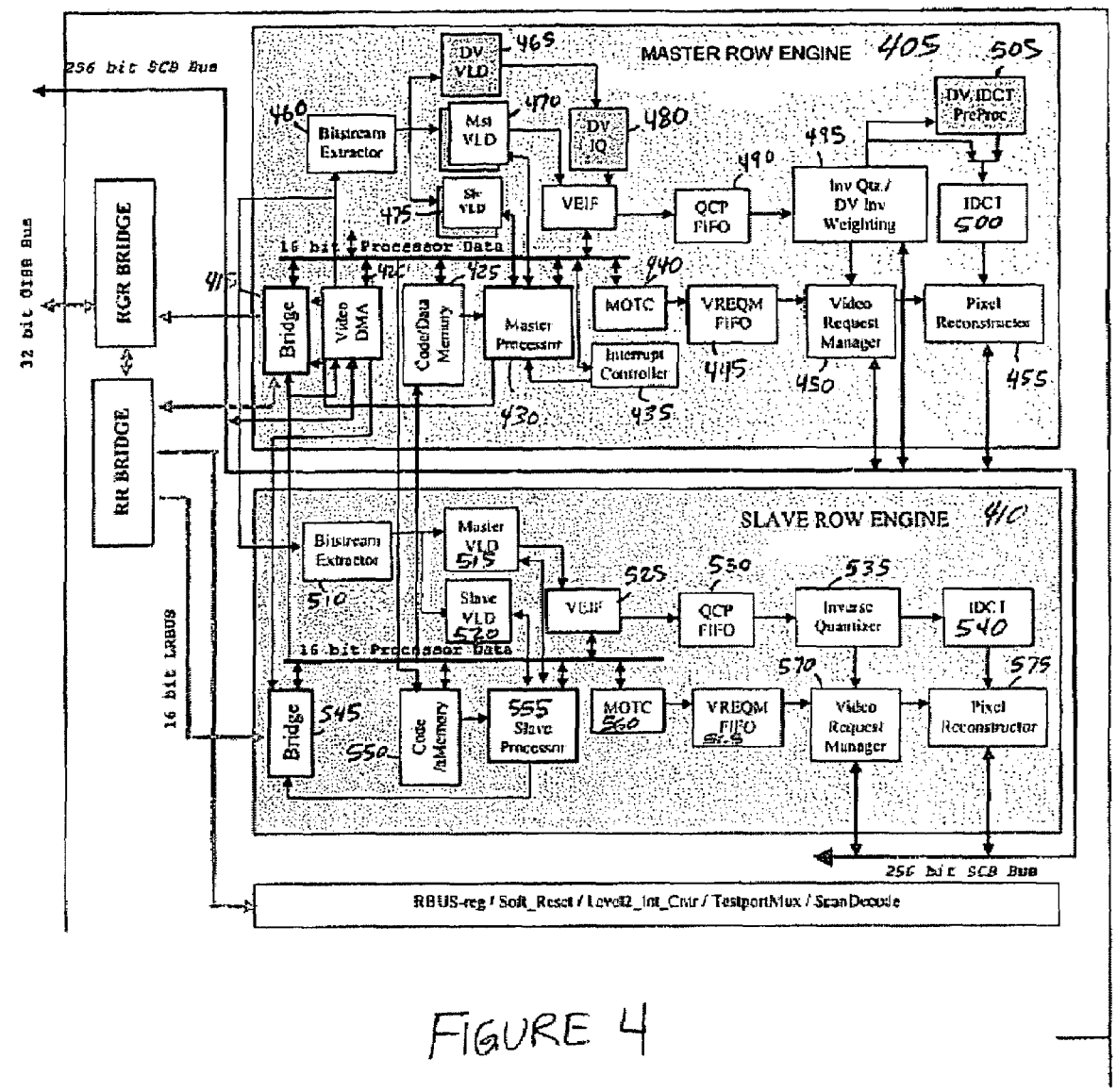
FIG. 4 is a block diagram of the video decoder in accordance with an embodiment of the present invention.

Referring now to FIG. 4, there is illustrated a block diagram of an exemplary video decoder 209 in accordance with an embodiment of the present invention. The video decoder 209 comprises a master row engine 405 and a slave row engine 410. The master row engine 405 supports the MPEG-2, MPEG-4, and DV-25 encoding standards. However, in the case of MPEG-2 High Definition Television (HDTV), although the instructions are the same, the rate of data for decoding is high. Accordingly, the slave row engine 410 supplements the master row engine 405 for decoding MPEG-2 video data.

The host processor sends an indication to a master processor 430 in the master row engine 410, indicating the type of video data that is to be decoded. Responsive to receiving the signal, the master processor 430 loads the appropriate combination of instructions 295a, 295b, 295c, 295d from the instruction memory into a code data memory 425. If the indicator indicates that the video data is MPEG-2, the master processor 430 also loads the appropriate combination of instructions 295a, 295b, 295c, 295d from the instruction memory into a code data memory 550 in the slave row engine 410. After loading the appropriate combination of instructions 295a, 295b, 295c, 295d, the appropriate combination of instructions cause the master row engine 405 to accesses the video data with a video DMA 420.

The video data is received by a bitstream extractor 460. In the case where the video data is MPEG-2, the video data is also received by bitstream extractor 510. The combination of instructions 295a, 295b, 295c, 295d configure and otherwise drive the appropriate hardware in the master row engine 409 and slave row engine 410 for the type of video data received.

The master row engine 409 includes hardware components for decoding DV-25, MPEG-2, and MPEG-4 video. The master row engine 409 comprises a Video Engine Interface VEIF, a Quantizer Command Programming (QCP) First-In First-Out queue (FIFO) 490, a Motion Computer (MOTC) 440, a Video Request Manager (VREQM) FIFO 445, an Inverse Quantizer 525, a Video Request Manager 450, an Inverse Discrete Cosine Transformation (IDCT) block 500, and Pixel Reconstructor 455 that are used when decoding DV-25, MPEG-2, and MPEG-4 video data. The master row engine also includes a DV Inverse Quantizer (DVIQ) 480, a DV Variable Length Decoder (DV VLD) 465, and a DV IDCT Preprocessor 505 that are used when decoding DV-25 video data.

The slave row engine 410 comprises a master VLD 515, a slave VLD 520, video engine interface (VEIF) 525, a QCP FIFO 530, an inverse quantizer 535, an IDCT 540, a bridge 545, a slave processor 555, an MOTC 560, a VREQM FIFO 565, a video request manager 570, and a pixel reconstructer 575 that are used for decoding MPEG-2 video data.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for decoding video data encoded with a particular standard, said system comprising:
   a video decoder for decoding the video data encoded with the particular standard, wherein the video decoder comprises a master processor;
   instruction memory for storing:
      a first set of instructions for decoding encoded video data according to a first encoding standard; and
      a second set of instructions for decoding encoded video data according to a second encoding standard;
   a host processor for providing an indication to the video decoder indicating the particular encoding standard, wherein the video decoder, comprising the master processor, for decoding the video data encoded with the particular standard is discrete from the host processor; and
   wherein the video decoder executes the first set of instructions if the indication indicates that the particular encoding standard is the first encoding standard and executes the second set of instructions if the indication indicates that the particular encoding standard is the second encoding standard.

2. The system of claim 1, wherein the first encoding standard comprises MPEG-2 and the second encoding standard comprises MPEG-4.

3. The system of claim 1, wherein the instruction memory stores a third set of instructions for decoding encoded video data according to a third encoding standard, and wherein the video decoder executes the third set of instructions if the indication indicates that the particular encoding standard is the third encoding standard.

4. The system of claim 3, wherein the first encoding standard comprises MPEG-2, the second encoding standard comprises MPEG-4, and the third encoding standard comprises DV-25.

5. The system of claim 3, wherein the instruction memory stores a fourth set of instructions for decoding the video data in accordance with the first encoding standard, the second encoding standard, and the third encoding standard.

6. The system of claim 1, further comprising a register for storing the indication from the host processor.

7. The system of claim 6, wherein the instruction memory stores a fifth set of instructions, wherein execution of the instructions by the host processor cause:
   detecting the particular encoding standard; and
   writing the indicator to the register.

8. The system of claim 1, wherein:
   the first set of instructions comprises a common instruction set and a first encoding standard instruction set; and
   the second set of instructions comprises the common instruction set and a second encoding standard instruction set.

9. A method for decoding video data encoded with a particular standard, said method comprising:
   receiving an indication from a host processor by a video decoder indicating the particular encoding standard, wherein the video decoder comprises a master processor and is discrete from the host processor;
   executing a first set of instructions if the indication indicates that the particular encoding standard is a first encoding standard; and
   executing a second set of instructions if the indication indicates that the particular encoding standard is the second encoding standard; providing an indication by a host processor to the video decoder indicating the particular encoding standard, wherein the video decoder, comprising the master processor, for decoding the video data encoded with the particular standard is discrete from the host processor; and
   wherein the video decoder executes the first set of instructions if the indication indicates that the particular encoding standard is the first encoding standard and executes the second set of instructions if the indication indicates that the particular encoding standard is the second encoding standard.

10. The method of claim 9, wherein the first encoding standard comprises MPEG-2 and the second encoding standard comprises MPEG-4.

11. The method of claim 9, further comprising executing the third set of instructions if the indication indicates that the particular encoding standard is the third encoding standard.

12. The method of claim 11, wherein the first encoding standard comprises MPEG-2, the second encoding standard comprises MPEG-4, and the third encoding standard comprises DV-25.

13. The method of claim 11, executing a fourth set of instructions for decoding the video data in accordance with the first encoding standard, the second encoding standard, and the third encoding standard.

14. The method of claim 9, further comprising:
detecting the particular encoding standard; and
writing the indicator to a register.

15. The method of claim 9, wherein:
the first set of instructions comprises a common instruction set and a first encoding standard instruction set; and
the second set of instructions comprises the common instruction set and a second encoding standard instruction set.

16. A system for decoding video data encoded with a particular standard, said system comprising:
a code memory for instructions; and
a master decoder processor for loading the code memory with a first set of instructions for decoding encoded video data according to a first encoding standard, where the video data is encoded according to the first encoding standard and for loading the code memory with a second set of instructions for decoding encoded video data according to a second encoding standard, wherein the video data is encoded according to the second encoding standard; receiving an indication at the master decoder processor indicating the particular encoding standard for decoding the video data encoded with the particular standard;
wherein the master decoder processor loads the code memory after receiving an indication from a discrete host processor indicating the particular encoding standard.

17. The system of claim 16, wherein execution of the first set of instructions by the master decoder processor controls a first plurality of circuits, and execution of the second set of instructions controls a second plurality of circuits.

18. The system of claim 16, further comprising a slave engine, said slave engine further comprising:
another instruction memory for storing a third set of instructions if the encoding standard is the second encoding standard.

19. The system of claim 18, wherein the slave engine comprises a third plurality of circuits, wherein the execution of the third set of instructions controls the third plurality of circuits.

20. The system of claim 16, wherein:
the first set of instructions comprises a common instruction set and a first encoding standard instruction set; and
the second set of instructions comprises the common instruction set and a second encoding standard instruction set.

* * * * *